Patented Nov. 16, 1926.

1,607,447

UNITED STATES PATENT OFFICE.

RUDOLF DEGKWITZ, OF PASING, NEAR MUNICH, GERMANY, ASSIGNOR TO THE FIRM EDUARD GREUTERT & CIE., OF BASEL, SWITZERLAND.

PROCESS OF PREPARING A MEASLES VACCINE AND A SERUM OBTAINED THEREFROM.

No Drawing. Application filed May 6, 1922, Serial No. 559,066, and in Germany May 10, 1921.

The principle of protection against measles is the same as the principle of Jenner's vaccination against small-pox. The measles germ is caused to grow in the incubator and its virulence is diminished by especial conditions of growth, whilst its immunizing power against measles is preserved. Healthy persons are vaccinated with small quantities of inoculated, diluted culture-medium containing living, but attenuated germs and thus after a time become immune against virulent original germs. The vaccination is done by injecting small quantities of the protecting material under the skin or placing it on the nasal mucous membrane.

Naso-pharyngeal secretions or blood of measles patients are filtered through filters impenetrable for bacteria and the filtrate is inoculated on the culture-medium. There are other ineffective organisms than bacteria and the measles germ is one of such organisms and is known to belong to the class of invisible, filtrable disease germs.

The culture-medium is composed of two constituents. The first is prepared by eliminating the corpuscles from preferably unaltered blood and by diluting the liquid with one quarter of its volume. For the purpose of dilution a liquid is used, which does not alter the blood's natural condition, which has the same physical-chemical reaction as the blood and contains the same quantity of anions and kations and which is capable of maintaining those conditions during the growth of the germs.

Culture-medium made in the described manner is inoculated with small quantities of filtered nasopharyngeal secretions or blood and put in the incubator for 12 to 16 days.

The analysis of the dilution liquid gives the following results: $H_2O$ 1000 c. cm. Na. 0.14260 mol K. 0.00565 mol Ca 0.00220 mol Cl' 0.10690 mol $CO_3''$ 0.00894 mol $PO_4'''$ 0.00073 mol Mg'' 0.00191 mol.

The method above described can also be employed for making a vaccine against measles on the same principle as Behring's diphtheria prophylaxis: animals are treated with specific poisons of the germs and the serum of those animals is injected into or otherwise applied to exposed or infected persons, who have not yet fallen ill. After the application of the serum an infection becomes impossible or an existing infection cannot develop into the disease.

For this purpose animals are injected with measles germs cultivated in the described way and their serum is prepared after some time in the usual manner.

What I claim is:

1. The herein described process of preparing a measles vaccine which consists in passing infective material from a measles infected person through a filter to obtain a filtrate consisting of virile organisms causative of measles, substantially isolated from other organisms, inoculating the culture medium with the filtrate and placing the same under conditions to propagate the growth of the causative organisms.

2. The herein described process of preparing a measles vaccine which consists in passing infective material from a measles infected person through a filter to obtain a filtrate consisting of virile organisms causative of measles substantially isolated from other organisms, inoculating the filtrate in a culture medium consisting of unaltered blood from which the corpuscles have been removed and diluted with a liquid which does not alter the blood's natural condition, which has the same physical and chemical reaction as the blood and containing the same quantity of anions and kations and is capable of maintaining such conditions during the growth of the germs, and finally causing the filtrate to grow in an incubator.

3. The process as claimed in claim 1 which comprises injecting into an animal the thus prepared virus, taking the serum from the animal and preparing therefrom an antiserum.

4. The process as claimed in claim 2 which comprises injecting into an animal the thus prepared virus, taking the serum from the animal and preparing therefrom an antiserum.

5. The process of producing a measles serum, consisting in growing measles virus in an artificial culture medium, and injecting said virus into an animal, and taking the serum from the animal.

6. The process of preparing measles virus for inoculation against measles which consists in growing the virus of infective material from measles infected persons in an artificial culture medium.

7. A culture medium for measles virus, consisting of the residual liquid derived from human blood, obtained by separation of the corpuscles, and diluted with a liquid which does not alter the blood's natural condition, which has the same physical-chemical reaction as the blood, and contains the same quantities of anions and kations, and which is able to maintain those conditions during the cultivation of the measles virus.

8. A dilution liquid for measles culture media, composed of $H_2O$, 1000 c. cm.; $Na^{\cdot}$, 0.14260 mol; $K^{\cdot}$ 0.00565 mol; $Ca^{\cdot\cdot}$ 0.00220 mol; $Cl'$ 0.10690 mol; $CO_3''$ 0.00894 mol; $PO_4'''$ 0.00073 mol; $Mg''$ 0.00191 mol.

9. A new product, artificially grown measles virus.

10. A new product, comprising a culture medium containing an artificial growth of measles virus.

11. A new product, infective measles virus inoculated on a culture medium.

12. A new product, consisting of anti-measles animal blood serum, obtained from a measles virus culture, for injection against measles.

In testimony whereof I hereunto affix my signature.

Dr. RUDOLF DEGKWITZ